No. 859,172. PATENTED JULY 2, 1907.
W. E. EVERITT & E. G. THOMPSON.
LAWN MOWER.
APPLICATION FILED JUNE 13, 1904.

3 SHEETS—SHEET 1.

Witnesses.
L. M. Sangster.
Geo. A. Neubauer.

Inventors.
Walter E. Everitt
Edward G. Thompson
By A. J. Sangster
Attorney.

No. 859,172. PATENTED JULY 2, 1907.
W. E. EVERITT & E. G. THOMPSON.
LAWN MOWER.
APPLICATION FILED JUNE 13, 1904.

3 SHEETS—SHEET 2.

Witnesses.
L. M. Sangster.
Geo. A. Neubauer.

Inventors.
Walter E. Everitt
Edward G. Thompson
By A. J. Sangster,
Attorney.

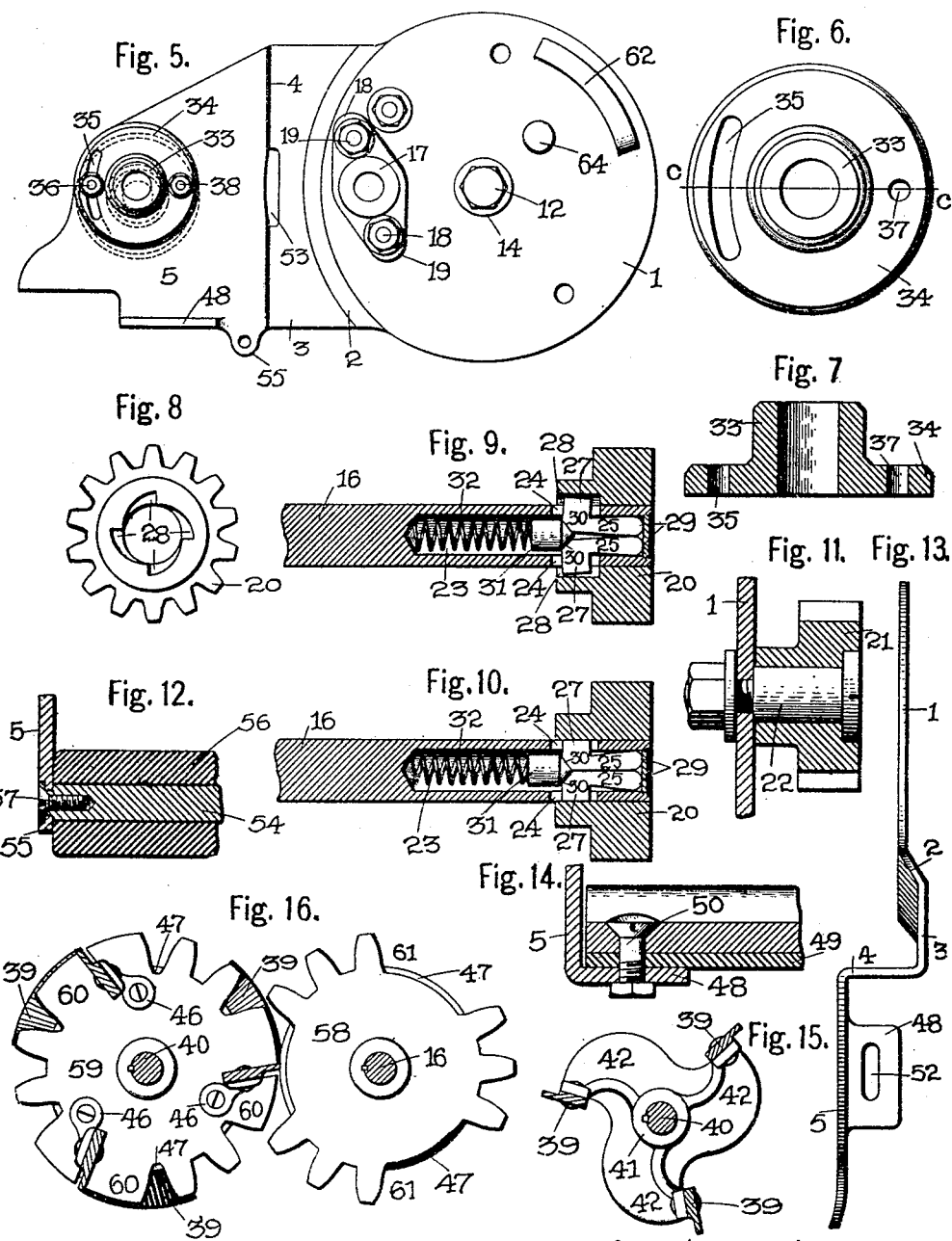

UNITED STATES PATENT OFFICE.

WALTER E. EVERITT AND EDWARD G. THOMPSON, OF BUFFALO, NEW YORK; SAID THOMPSON ASSIGNOR OF ONE-THIRD OF HIS RIGHT TO SAID EVERITT.

LAWN-MOWER.

No. 859,172.     Specification of Letters Patent.     Patented July 2, 1907.

Application filed June 13, 1904. Serial No. 212,266.

*To all whom it may concern:*

Be it known that we, WALTER E. EVERITT and EDWARD G. THOMPSON, citizens of the United States, residing at Buffalo, in the county of Erie and State of New York, have invented certain new and useful Improvements in Lawn-Mowers, of which the following is a specification.

This invention relates to an improved lawn mower.

One of the features of the invention consists in a construction embodying two angular side frame members, supporting wheels journaled on the outer surfaces of the rear portions of the angular side frame members and a rotary cutter journaled between the front portions of the angular side frame members, whereby the outer faces of the supporting wheels are in approximately longitudinal alinement with the front portions of the side frame members, and the rotary cutter is substantially equal in length to the width of the lawn mower.

Another feature has reference to a novel connecting means between the wheels of the mower and the cutter operating shaft which serves to rotate the shaft and drive the cutter only when the mower is traveling forward, whereby the cutter and its operating shaft is stationary when the mower is moved backward.

The principal object of the invention is to provide means for cutting the entire width of the machine and thus enable the cutting of grass close to a fence or shrubbery or around a tree by the machine itself, instead of requiring a separate hand knife or similar device to trim the grass closely and at the same time construct the lawn mower of substantially the same width throughout.

The invention also relates to certain details of construction, all of which will be fully and clearly hereinafter described and claimed, reference being had to the accompanying drawings, in which,—

Figure 1:
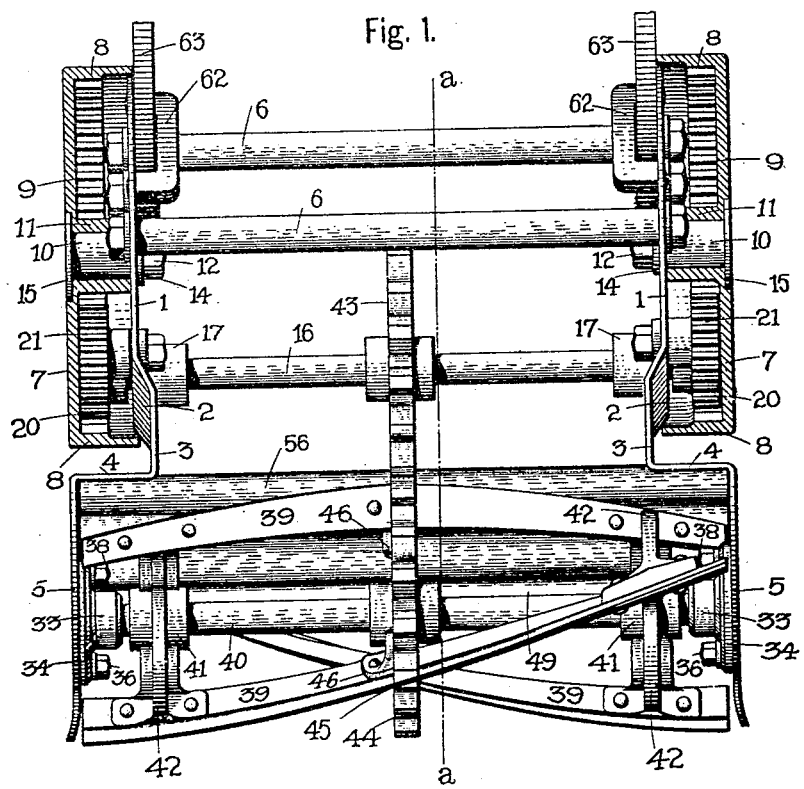
Figure 2:
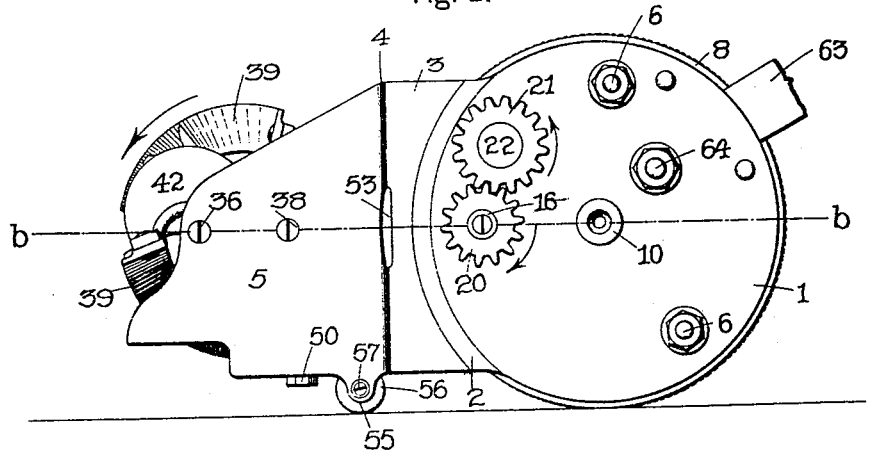
Figure 3:
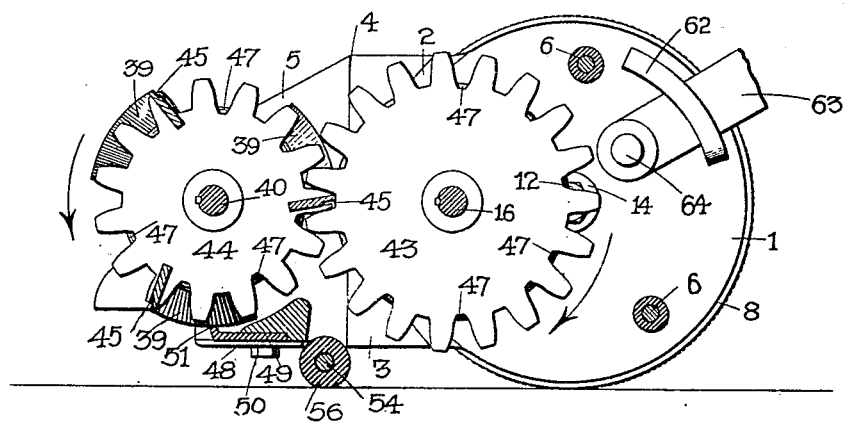
Figure 4:
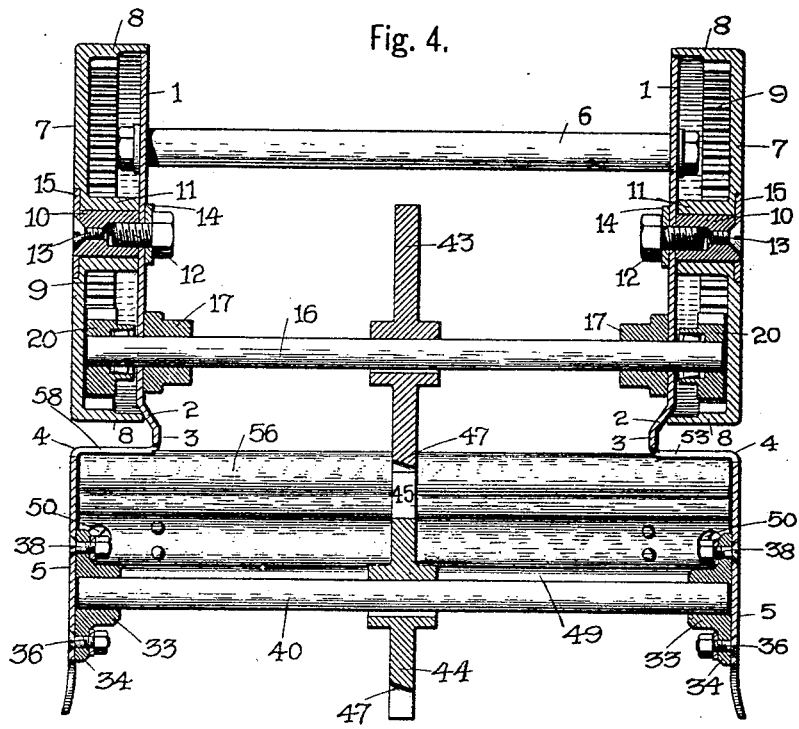

Figure 1 is a plan view of the lawn mower, a central horizontal section being cut through the supporting wheels to show the interior mechanism. Fig. 2 is a side elevation of the lawn mower with one of the supporting wheels taken off to expose the interior gearing. Fig. 3 is a transverse section through the lawn mower on line *a a*, Fig. 1. Fig. 4 is a horizontal section through the lawn mower on line *b b*, Fig. 2, the rotary cutter being removed. Fig. 5 is a detached inside view of one of the side frame members, the bearing for the cutter shaft being shown in one position in full lines and in another position in dotted lines. Fig. 6 is an enlarged detached inside view of one of the bearings for the cutter shaft. Fig. 7 is a section on line *c c*, Fig. 6. Fig. 8 is an enlarged detached inside view of one of the ratchet gear wheels. Fig. 9 is an enlarged section through a fragment of the driving shaft and one of the ratchet gear wheels, showing the pawls in locking position. Fig. 10 is a view similar to Fig. 9, showing the pawls in retracted position. Fig. 11 is an enlarged section through a fragment of one of the side frame members showing the method of supporting the idle gear wheels. Fig. 12 is an enlarged section through a fragment of the side frame member and the evening roller. Fig. 13 is a detached top plan view of one of the side frame members. Fig. 14 is an enlarged section through a fragment of the side frame member and the stationary cutter. Fig. 15 is a detached transverse section through the cutter shaft and the rotary cutters, showing the method of supporting the ends of the cutters. Fig. 16 is a detached transverse section through the driving and cutter shafts, showing another form of gearing.

In this invention a rotary cutter is located in front of the supporting wheels of the mower and rotated by an operating shaft journaled in the mower frame which in turn is rotated by gearing connecting to the supporting wheels. The frame of the mower consists of two side frame members which are secured in separate arrangement by means to be described hereinafter. These members are substantially similar in size and form being of the angular shape shown in Figs. 1, 2, 3 and 4, and each consists of a longitudinally extending rear portion 1, which is nearly circular in outline and an angular intermediate portion which extends diagonally inwardly and forwardly from the rear portion as indicated at 2, in Figs. 1 and 4, then bends to extend longitudinally as at 3, in Figs. 1 and 4, and again bends at substantially right angles to said portion 3, to extend transversely out as at 4, and a forward portion 5, which extends longitudinally from the outer extremity of the transverse part 4. The two side members are supported in separated arrangement by a series of transverse tie rods 6, as shown in Figs. 1 and 4.

A wheel is journaled on a short shaft extending out from the center of each of the rear portions 1, of the side members, and as these wheels are similar a description of the mechanism of one will suffice for both. The wheel consists of a circular disk 7, having a laterally extending peripheral flange 8, which is sufficiently wide to provide a fairly wide tread for the wheel. The inner surface of the flange is at least in part toothed as shown at 9, in Fig. 4, to constitute an internal gear for a purpose hereinafter set forth. The short shaft 10, upon which a central hub 11, extending from the wheel is journaled, is of hollow form and interiorly screw threaded having two screw threaded sockets of differing size as shown in Fig. 4. A screw 12, is fitted through a center opening in the rear portion 1, and screwed into the large socket in the shaft 10, and a smaller sized screw 13, is fitted through a central opening in the disk 7, and screwed into the smaller socket as shown in Fig. 4. A washer 14, may be interposed between the head of the screw 12, and the inner surface of the rear portion 1, and likewise a washer 15, may be fitted in a countersink seat in the disk 7, and between the disk surface and the head of the screw 13. A transverse shaft 16, is journaled in bearings 17, fastened to the rear portions of the side members. These bearings 17, are provided with oppositely extending ears or lugs 18, which are bolted to the rear portions 1, by bolts 19. This shaft 16, is located in front of the wheel shafts 10, and is provided with a gear wheel 20, at or near each end which meshes with an idle gear 21, loosely mounted on a short shaft 22. The idle gear wheel in turn meshes with the internal gear 9, of the flange and serves to operatively connect the shaft 16, to the supporting wheels. These gears are arranged in two similar separated sets located one on each side of the machine, and each connecting one end of the shaft 16, to one of the supporting wheels, and are inclosed within the flange 8, of the wheel and between the disk 7, and rear portion 1, of the side member to which the wheel is rotatably attached. The disk and flange of each wheel together with the rear portion of the side frame member to which it is attached constitute a substantially circular inclosing case for the gears. Hereinafter the shaft 16, will be referred to as the driving shaft.

The gear wheels 20, are arranged so that they are free to rotate in one direction independently of the driving shaft so that when the mower is trundled backward, the gear wheels will revolve and the shaft 16, remain stationary. This is accomplished by a ratchet and pawl device, the driving shaft being recessed at each end as shown at 23, and provided with slots 24, which extend oppositely and outwardly from the recesses through the surface of the shaft, and pawls 25, being fitted in the shaft recesses 23, with their locking lugs 27, extending through the slots 24, and the gear wheels having internal ratchets 28, with which the pawl lugs 27, engage and lock.

The pawls are of the peculiar shape shown in Figs. 9 and 10, and are arranged in pairs with their laterally extending locking lugs projecting in opposite directions. One end of the pawls are rounded as at 29, and the opposite extremities are provided with beveled edges 30, against which the tapering end of a pin 31, is forced by a spring 32, to yieldingly press the locking lugs into engagement with the internal ratchet 28.

A rotary cutting device is journaled between the forward portions 5, of the side members in bearings which are adjustably attached to said forward portions. These bearings each having a bearing socket 33, for the reception of the cutter shaft end and a flange 34, extending outwardly from one end of the socket which is provided with a curved slot 35, through which a bolt 36, is passed to fasten the bearing to the side frame member. The flange 34, is likewise provided with a bolt hole 37, on the side opposite the slot through which a bolt 38, is passed to fasten that side of the bearing to the frame member. The slot 35, is curved to the circumferential line of a circle, having its center at the bolt hole 37, so that when the bolts 36 and 38, are loosened the bearing may be turned on the bolt 38, as a pivot to the distance permitted by the length of the slot 35, to adjust the bearings.

The preferred form of rotary cutting device as shown in the drawings consists of three curved cutting blades 39, which are supported at equal distances around a central cutter shaft 40, by hubs 41, which are arranged at or near the ends of the shaft and have three equally spaced radial arms 42, to the outer extremities of which the cutter blades 39, are fastened.

The cutter shaft 40, is driven from the driving shaft 16, by means of intermeshing gear wheels 43 and 44. These gears are preferably mounted at or near the center of the shafts, as shown in Figs. 1 and 4. The gear wheel 44, which is mounted on the cutter shaft also serves as a center support for the cutter blades, some of the teeth in said gear wheel being provided with deep cuts or recesses 45, through which the cutter blades pass as shown in Fig. 3. The cutting edge of the blades extends slightly beyond the periphery of the teeth so that it may cut without interference from the teeth, and the recesses between the teeth in the gear wheel 43, are made deep enough to avoid contact between the cutting edge and the bottom wall of the recesses.

The cutter blades are secured in place in the cuts 45, by blocks 46, which are fastened to the gear wheel 44 These blocks are arranged so that they brace the blades against strain in a cutting direction and thus practically remove the cutting strain from the recessed teeth and obviate any danger of breaking a portion from said recessed teeth. The recesses between the teeth are cut or grooved out so that they are deeper on one side than the other thereby forming a diagonally extending or inclined bottom surface 47, which constitutes a clearance for any material that may be caught up between the teeth. These surfaces are cut alternately in opposite directions whereby approximately one-half of the recesses between the teeth have their deepest cut upon one face of the gear wheel and the other half which alternate between the first mentioned half have their deepest cut upon the opposite face of the gear wheel so that both sides of the gear wheel is equally strong. The bottom of the forward portions 5, of the side members is bent inwardly to form ledges 48, upon which a stationary cutting blade 49, is secured by bolts 50. The stationary blade has a substantially horizontal body portion which is bent upwardly at its forward margin to form a cutting edge 51, which co-acts with the cutting edges of the rotary cutting blades. The ledges may be formed with longitudinal slots 52, through which the locking bolts 50, can be adjustably fitted, so that the stationary blade can be longitudinally adjusted. Openings 53, are cut in the transverse parts 4, of the angular portions of the side frame members to remove that portion of the wall of the part 4, in proximity to the supporting wheel, and avoid any possibility of dirt on the peripheries of the flanges 8, clogging the wheels. These slots or openings are cut in that portion of the transverse parts immediately between the supporting wheels and rotary cutter and thus serve not only to prevent dirt clogging the supporting wheels but also as clearance spaces for cut material and thus likewise prevent the clogging of the rotary cutter. This also permits making the transverse part very wide vertically so that the frame is sufficiently stiff and strong. A rod 54, extends transversely between and is fastened at its ends to ears 55, depending from the forward portions 5, of the side members, and a roller 56, is rotatably mounted on the rod. The rod 54, is secured to the ears by screws 57, which pass through the ears and screw into screw threaded recesses in the ends of the shaft. It will be noted that all openings or holes for bolts or screws on the outer surface of the side frame members are countersunk so that no projecting parts are left when the mower is assembled.

A peculiar form of mutilated gear is shown in Fig. 16, which may prove more advantageous than the gear shown in Figs. 1, 2, 3 and 4, for connecting the driving shaft to the cutter shaft. This gear mechanism consists of two gear wheels 58 and 59, one of which has certain of its teeth made wider than the others as shown at 60, and the other of which is provided which larger recesses 61, between some of its teeth to receive the extra wide teeth 60, of the first mentioned gear wheel. The teeth and recesses are equal in number to the blades in the rotary cutter and are formed extra wide to provide sufficient metal on each side of the slots in which the cutter blades fit to constitute a very strong and rigid construction.

While it is believed that the ordinary gear shown in Figs. 1 to 4, inclusive, are sufficiently strong for ordinary purposes, it may be found advisable to use gears similar to the wheels 58 and 59, for heavy work to avoid any possibility of breakage. A loop 62, is connected to the inner surface of each rear portion 1, of the side frame members, and the bifurcations 63, of the forked end of an operating handle are passed through the loops and pivoted to the side frame members by bolts 64.

One of the novel advantages of this improved lawn mower is that while it is of approximately the same width throughout, the cutting mechanism is also substantially equal in length to the width of the machine.

We claim as our invention.

1. In a lawn mower, a frame having two angular side frame members each composed of a longitudinal rear portion, an angular intermediate portion consisting of an oblique part adjacent to the rear portion, a short longitudinal part extending from the forward extremity of the oblique part and a transverse part, extending outwardly from the forward extremity of the short longitudinal part, and a longitudinal front portion extending forward from the outer extremity of the transverse part and the front portions of said members being separated from each other a greater distance than the rear portions and provided with lower inwardly bent parts forming ledges, supporting wheels journaled outside of the rear portions of said side frame members, a rotary cutter journaled in the frame in front of the supporting wheels and geared to said supporting wheels and substantially equal in length to the distance between the outer faces of the supporting wheels and a stationary cutter mounted on the inwardly extending ledges below the rotary cutter.

2. In a lawn mower, a frame having two side frame members each composed of a longitudinal rear portion, an angular intermediate portion consisting of an oblique part adjacent to the rear portion, a short longitudinal part extending from the forward extremity of the oblique part and a transverse part extending outwardly from the forward extremity of the short longitudinal part, and a longitudinal front portion extending forward from the outer extremity of the transverse part, and the front portions of said members being provided with lower inwardly bent longitudinally slotted parts forming ledges supporting wheels journaled outside of the rear portions of said side frame members, a rotary cutter journaled between the front portions of the frame members in front of the supporting wheels and geared to said supporting wheels; said rotary cutter being substantially equal in length to the distance between the cutter faces of the supporting wheels, a stationary cutter mounted on the inwardly extending ledges below the rotary cutter and bolts passing through the stationary cutter and longitudinal slots to adjustably fasten the stationary cutter to the ledges, substantially as set forth.

3. In a lawn mower, a frame having two angular side members, each composed of a rear portion, an angular intermediate portion which at least in part extends transversely and is slotted and a front portion, tie rods supporting said members in separated arrangement, supporting wheels rotatably attached to the exterior of the rear portions of said side members and partially inclosed at the front by the angular intermediate portions, and a rotary cutter journaled between the front portions of said members and located in front of and geared to said supporting wheels; the slots in the transverse portions of the side members being located at the points of nearest approach of the rotary cutter and supporting wheels to prevent clogging, substantially as set forth.

4. In a lawn mower, two side frame members each composed of a rear portion, an angular intermediate portion and a front portion, tie rods for securing said side members in separated arrangement, supporting wheels rotatably attached to the rear portion of the side frame members, a rotary cutter journaled between the front portions, and gearing connecting the rotary cutter to the supporting wheels; said angular intermediate portion at least in part extending transversely in proximity to the rotary cutter and the supporting tread of the wheels and being slotted in that portion directly between the rotary cutter and supporting wheels to provide clearance for cut material sufficient to prevent clogging, substantially as set forth.

5. In a lawn mower, two side frame members each composed of a longitudinally extending rear portion, an angular intermediate portion which at least in part extends transversely and a longitudinally extending front portion, tie rods for securing said side frame members in separated arrangement, supporting wheels rotatably attached to the exterior of the rear portions of the side frame members with their peripheries extending in proximity to the rear of the transverse parts of the intermediate frame portions, a rotary cutter journaled between the front portions and in front of the transverse parts, and gearing connecting the rotary cutter to the supporting wheels; the transverse parts of the side members being very wide vertically and being slotted in those portions between the supporting wheels and the rotary cutter to provide clearance and prevent clogging, substantially as set forth.

6. In a lawn mower, a frame composed of two side members, and rods for supporting said members in separated arrangement, a flanged wheel rotatably attached to the rear portion of each side member and having an internal gear, an idle gear wheel meshing with each internal gear wheel, a driving shaft having a gear wheel meshing with each idle gear wheel, a rotary cutter journaled between the front portions of the side members and intermeshing gear wheels mounted on the driving shaft and rotary cutter, substantially as set forth.

WALTER E. EVERITT.
EDWARD G. THOMPSON.

Witnesses:
A. J. SANGSTER,
L. M. SANGSTER.